United States Patent [19]
Granelli

[11] Patent Number: 5,096,599
[45] Date of Patent: Mar. 17, 1992

[54] PROCESS FOR PURIFYING THE EFFLUENT FROM UREA PRODUCTION PLANTS

[75] Inventor: Franco Granelli, Milan, Italy

[73] Assignee: Snamprogetti S.p.A., Milan, Italy

[21] Appl. No.: 568,984

[22] Filed: Aug. 17, 1990

[30] Foreign Application Priority Data

Sep. 15, 1989 [IT] Italy ................ 21742 A/89

[51] Int. Cl.$^5$ .............................. C02F 1/20
[52] U.S. Cl. ......................... 210/750; 55/38;
55/54; 210/765; 210/766; 210/774; 210/805;
210/903; 422/228; 564/72
[58] Field of Search ............ 210/738, 750, 765, 766,
210/774, 805, 903; 564/72; 422/228; 55/38, 54

[56] References Cited

U.S. PATENT DOCUMENTS

| | | | |
|---|---|---|---|
| 3,922,222 | 11/1975 | Van Moorsel | 210/71 |
| 4,087,513 | 5/1978 | Schell | 210/774 |
| 4,098,579 | 7/1978 | Starzycki et al. | 261/114.4 |
| 4,220,635 | 9/1980 | Schell | 423/358 |
| 4,354,040 | 10/1982 | Inoue et al. | 564/72 |

FOREIGN PATENT DOCUMENTS

0019326 11/1980 European Pat. Off. .
0053410 6/1982 European Pat. Off. .

*Primary Examiner*—Peter Hruskoci
*Attorney, Agent, or Firm*—Shea & Gould

[57] ABSTRACT

A process for purifying the effluent originating from urea production plants, consisting of three successive treatment stages, namely stripping of the volatile components, thermal hydrolyis of the urea and biuret in a plurality of zones traversed with piston flow, and final stripping of the volatile components produced by the hydrolysis.

7 Claims, 2 Drawing Sheets

PROCESS FOR PURIFYING THE EFFLUENT FROM UREA PRODUCTION PLANTS

This invention relates to a process for treating the effluent of urea production plants, to produce purified water reusable for technical purposes without any limitation.

The industrial production of urea is based on known synthesis from ammonia and carbon dioxide in accordance with the overall reaction $$2NH_3 + CO_2 \rightarrow CO(NH_2)_2 + H_2O$$

by which one mole of water is formed for each mole of urea produced, with a consequent production of about 300 kg of water for every tonne of urea.

This stoichiometric water quantity deriving from the synthesis reaction is however not the only water leaving an industrial plant, as there is further water fed continuously to the plant, both in the form of wash water and pump flushing water and in the form of drive steam for the ejectors, making a further quantity of 150 kg per tonne of urea.

This water quantity continuously discharged from the plant is increased by the water which is intermittently fed to the plant for washing the equipment, drainage water, discharge from water guards etc., which raise the total quantity of effluent for treatment to about 500 kg per tonne of product urea. Considering the typical production of a modern urea production plant as 1700 tonnes per day, the water quantity to be treated is considerable, amounting to 850 m³ per day.

The treatment of this effluent, which is contaminated with ammonia, carbon dioxide and urea, is very important both because antipollution laws for ammonia and urea are stringent, and because its recovery and reuse is of great significance in production economics.

Ammonia and carbon dioxide are present in the plant effluent for various reasons, namely that they are not completely converted into urea during the process, that in the final process stages they are formed by partial hydrolysis of the already produced urea, that they arise from the decomposition of biuret, an undesirable co-product but one which is fatally associated with urea, and finally that they are present in the aforesaid intermittent discharges.

Urea is present in the effluent both because it is entrained in the final plant stages and because it is contained in the intermittent discharges.

Various process modifications and improvements have reduced the content of these pollutant compounds but have not eliminated them. An indicative urea process effluent composition is the following:

| | |
|---|---|
| ammonia | 2-5% by weight |
| carbon dioxide | 1-2.5% by weight |
| urea | 0.5-2% by weight |
| water | remainder to 100%. | a small quantity of biuret being included in the urea.

Recovery of these ammonia and urea quantities was ignored in the first industrial plants, but was then taken into consideration because at least up to a certain level of recovery it was advantageous for plant production, and because it became necessary on account of antipollution legislation, with increasingly severe requirements.

The ecological problems of such compounds in effluents are well known, namely the toxicity of ammonia above certain levels, eutrophication caused by urea and ammonia as nutrients for algae and bacteria in waters, and finally the reduction of dissolved oxygen in waters. All urea production plants, both the existing ones and in particular the new ones, have to be fitted with a sophisticated effluent treatment section, not only for reactant recovery but also because of the penalties provided by the antipollution laws.

In the known art the ammonia is generally removed by stripping with steam or air. For urea removal, various treatment methods have been proposed and used. Those which merit mention are biological oxidation, oxidation with hypochlorite or nitrites, reverse osmosis, absorption on resins, total water evaporation (with consequent destruction of the urea) and finally hydrolysis, either in the presence of phosphoric acid or as simple thermal hydrolysis using the reverse reaction to that for urea formation, as described initially but in the opposite direction, i.e. decomposition. This latter is the method mostly applied, and there are numerous industrial processes based on thermal decomposition of urea, each enabling a certain level of purification to be obtained.

The present invention provides a process for purifying the effluent from urea production plants to a very low content of pollutant compounds, such as not only to satisfy the most severe legal limits but also to allow the treated effluent to be completely reused.

BRIEF DESCRIPTION OF THE DRAWINGS

The process according to the invention is based on the thermal decomposition of the urea and stripping of the ammonia and carbon dioxide, and is described with reference to a typical embodiment, which is shown in FIGS. 1 and 2 by way of non-limiting example. The process takes place in three successive stages.

In the first stage, consisting of a volatile compound stripping stage, the ammonia and carbon dioxide pollutants dissolved in the effluent from the urea production plant are separated. In the second stage the effluent is subjected to thermal hydrolysis, in which the non-volatile compounds, ie urea and biuret, are decomposed into the volatile compounds ammonia and carbon dioxide.

Finally, in the third stage the products of the previous decomposition are stripped out to produce effluent purified to the required level.

Figure 1:
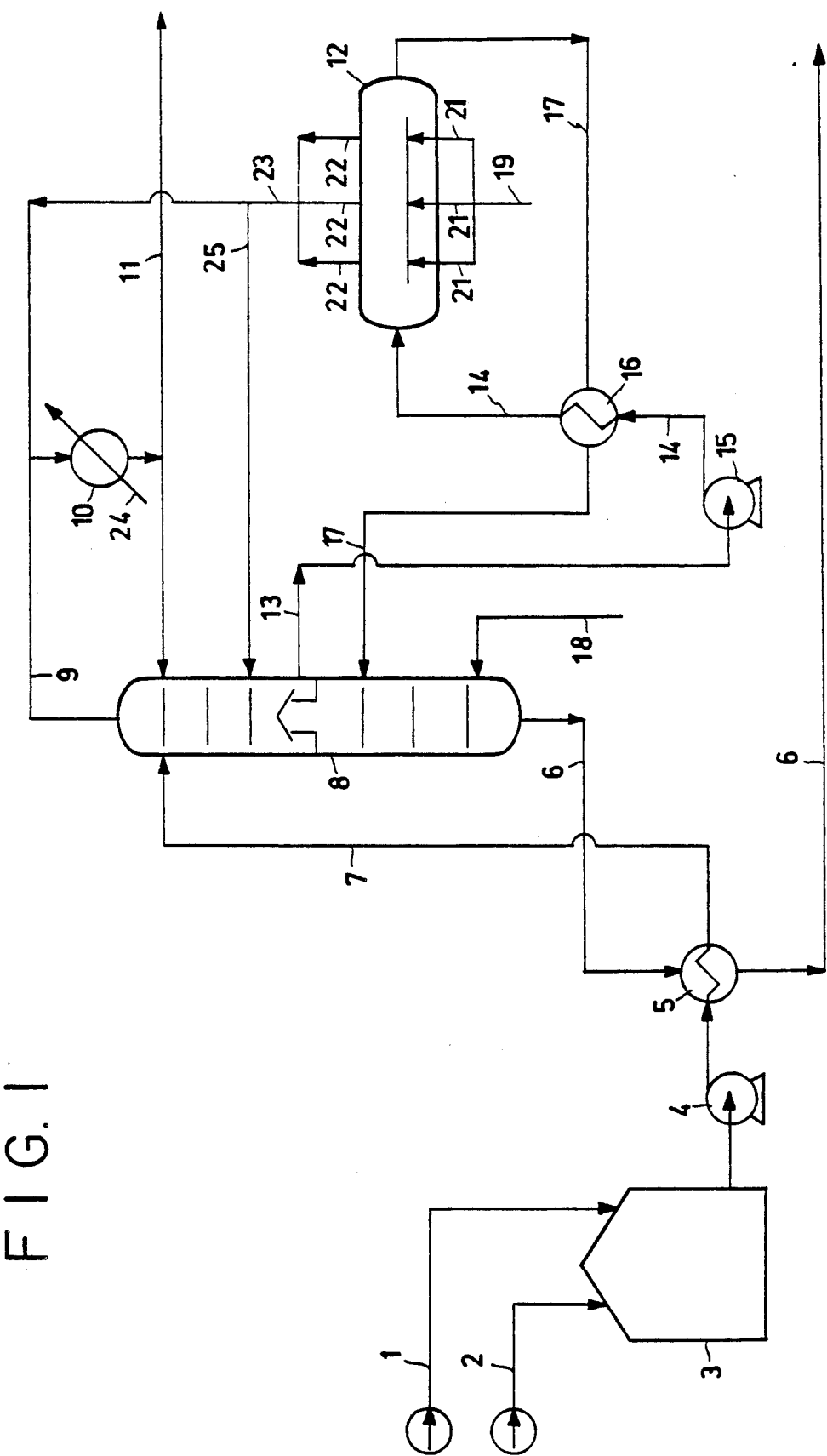
Figure 2:
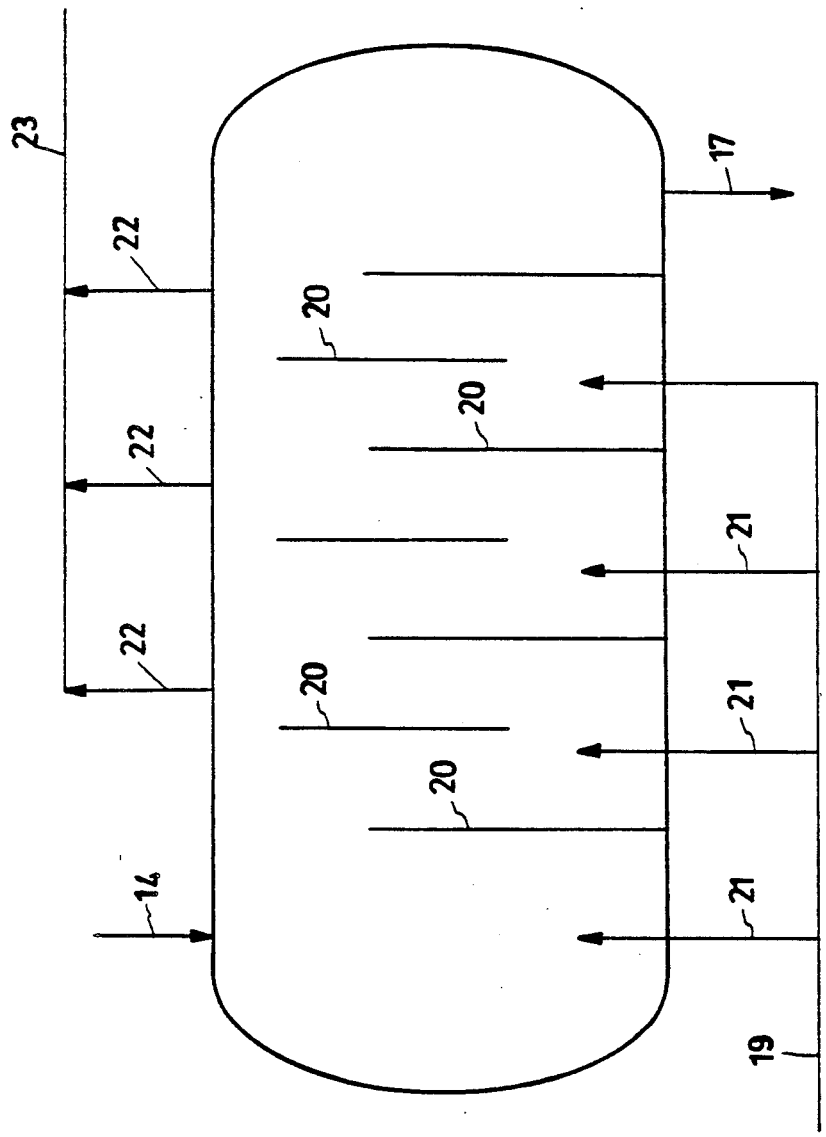

FIG. 1 shows the process flow diagram, and FIG. 2 the main apparatus, i.e. the hydrolyzer, of the decomposition process of the non-volatile pollutants. In the following description the non-volatile components, i.e. urea and biuret, will be indicated for brevity as urea, on the understanding that the urea is accompanied by a percentage of co-product biuret.

The continuous discharges, essentially those from the urea under vacuum concentration sections, plus the intermittent discharges are conveyed by the lines 1 and 2 respectively to the collection tank 3. The effluent to be treated in the plant has the following indicative composition:

| | |
|---|---|
| ammonia | 2-5% by weight |
| carbon dioxide | 1-1.25% by weight |
| urea | 0.5-2% by weight |

| | |
|---|---|
| -continued | |
| water | remainder to 100% | its temperature varying between 10° C. and 50° C. according to environmental and local conditions.

The effluent collected and equalized in 3 is fed by the pump 4 to the heat exchanger 5, in which it is preheated with countercurrent heat transfer by the purified effluent fed to the plant battery limits. The preheated effluent is fed through the line 7 into the top of the stripping column 8, provided with plates for contact between the liquid phase and vapour phase. From the top of the column 8 a vapour stream comprising ammonia, carbon dioxide and water leaves through the line 9 and is totally condensed in the condenser 10. The aqueous ammonia and carbon dioxide solution obtained is recycled through the line 11 to the urea plant for reuse. A part of it can be recycled to the column as reflux.

As a process alternative, and depending on the composition of the effluent to be treated and the characteristics of the urea plant to which the process is connected, the vapour stream from the column 8 can be recycled directly to the urea plant to enable part of its heat of condensation to be recovered. In this case the cooling fluid fed to the heat exchanger (10) through the line 24 is not cooling water but a process fluid of the urea production process. The upper part of the column 8 implements the first of the three process stages.

The second stage consists essentially of the hydrolyzer 12, the structure of which will be apparent from FIG. 2 and from the description given hereinafter.

The effluent is withdrawn from the stack plate of the column 8 and fed through the lines 13 and 14 by the pump 15 to the hydrolyzer 12 after being heated in the heat exchanger 16 in which heat is transferred between the effluent fed to the hydrolyzer and that discharged from it through the line 17.

The effluent residence time in the hydrolyzer 12 is between 20 and 40 minutes; the hydrolysis temperature is between 200° and 240° C. and the pressure between 20 and 40 bars gauge. A longer hydrolysis time does not have any appreciable effect on the purification obtained.

Under these conditions substantially complete decomposition of the urea to ammonia and carbon dioxide can be obtained by the reverse reaction to the synthesis.

After undergoing hydrolysis, the effluent is fed to the third treatment and purification stage. Said third stage is conducted in the lower part of the column 8, to which it is fed through the line 17 and leaves through the line 6.

It has a residual ammonia and urea content of between 10 and 0.4 ppm for each of the two pollutants.

In the described embodiment, the first and third process stage are stripping stages conducted in the upper and lower part of the same column 8. This is the preferred method because of its obvious economical advantage. The invention can however also be implemented by separating the stages into two different stripping units. This is necessary when it is required to improve the effluent purification of a urea plant already provided with partial effluent treatment comprising only stripping.

The heat required for the stripping in the column 8 is provided by live steam fed to the base of the column 8 through the line 18. Alternatively, this heat can be supplied by a classical reboiler at the bottom of the column.

The stripping column 8 is provided with plates for contact between the descending liquid phase and the ascending vapour phase for mass and heat transfer. These can be conventional valve, bubble cap or perforated plates. Instead of using plate columns, packed columns of known type can be used.

The operating pressure of the column 8 is preferably between 1.5 and 4 bars gauge, and the temperature is between 128° and 150° C. The hydrolysis reaction is endothermic and heat must be supplied to the hydrolyzer 12 both to raise the effluent to the hydrolysis temperature and to sustain the reaction. This is done by feeding live steam through the line 19.

A typical embodiment of the hydrolysis reactor is shown in FIG. 2.

It consists of a horizontal cylindrical reactor to which the effluent is fed through the line 14 and discharged through the line 17. Baffles 20 are provided in its interior such that the effluent undergoes a piston flow and the inlet and exit effluent streams cannot mix. The number and size of the baffles depend on the process parameters, such as the throughput and composition of the effluent to be treated and the degree of purification required. This number is generally between 6 and 15. The baffles are of two different types arranged alternately. The first is cut horizontally only at its top, so that its total height is 70-90% of the reactor diameter, whereas the second is cut horizontally both at its top and at its bottom in a substantially symmetrical manner, but with the total height still 70-90% of the reactor diameter.

The baffles divide the hydrolyzer into a certain number of zones and oblige the water to pass through them in succession along a tortuous path with piston flow, these zones representing individual hydrolysis stages into each of which live steam from the manifold 19 is fed through the lines 21.

The liquid level and the height of the top space occupied by the vapour phase are determined by the distance between the base and the upper edge of those baffles which are not cut along their bottom but rest on the lower cylindrical surface of the reactor. The hydrolysis products, ie ammonia and carbon dioxide, separate from the effluent as they are produced and collect in the top of the hydrolyzer to leave through the lines 22, to then meet in the manifold 23 from which they are fed to the condenser 10 together with the overhead vapour stream from the column 8, or are recycled to the urea plant as already stated.

According to an alternative embodiment they can be fed to the upper part of the column 8.

The present invention has many advantages, of which the following merit mention.

The process according to the invention is able to treat all the effluent from urea plants and purify it to the required level, expressed in terms of ppm of urea and ammonia, to satisfy the antipollution regulations of the various countries.

By simply varying the operating conditions in terms of pressure, temperature, residence time and steam consumption within the aforesaid limits, any residual ammonia and urea value can be obtained. Generally, even the most severe regulations do not set limits of less than 10 ppm for these compounds, whereas the process of the invention enables limits to be reached which are not only less than 10 ppm but even below 1 ppm. This performance means that the treated effluent is suitable for use as boiler feed water, even for steam production at 110 bars, for which limits among the most restrictive are set.

The indicated process conditions enable residual urea contents of between 10 and 0.4 ppm to be obtained.

The preferred hydrolysis conditions for obtaining very high purification to an ammonia and urea level equal to or less than 1 ppm are as follows:

| pressure | 33-37 bars gauge |
|---|---|
| temperature | 230-236° C. |
| No. of baffles | 8-12 |
| baffle height | 75-85% |
| residence time | 30-40 minutes |

These values vary according to the pollutant load of the effluent to be treated.

The material in contact with the effluent is stainless steel, and no introduction of passivating air is required to prevent corrosion. This is a further advantage of the invention because it dispenses with the cost of compressing the passivating air and the problem of atmospheric pollution caused by the presence of ammonia in the passivating air when this is discharged.

EXAMPLE 42 m³/h of effluent is discharged from an industrial urea production plant with the following composition:

| ammonia | 5% by weight |
|---|---|
| carbon dioxide | 2.5% by weight |
| urea | 1% by weight |
| water | 91.5% by weight |

This water is treated in a first stripping stage in the upper part of the column 8 and is then fed to the hydrolyzer operating at 34 bars gauge and a temperature of 234° C.

After a residence time in the hydrolyzer of 32 minutes the effluent is treated in a second stripping stage in the lower part of the column 8, this latter being a single plate column with an intermediate stack plate.

The column 8 operates at 2.5 bars gauge and 138° C. It has a diameter of 1400 mm and is divided into two sections, namely the upper section with 20 valve plates and the lower section with 35 plates.

The treated effluent leaves the bottom of the stripping column at a flow rate of 47 m³/h and contains 0.51 ppm of ammonia and 0,48 ppm of urea. The total steam consumption is 11700 kg/h. The treated effluent is used in a boiler to produce steam at 103 bars.

In addition, 6700 kg/h of an ammonia and carbon dioxide solution are recovered, with the following composition:

| ammonia | 35.0% by weight |
|---|---|
| carbon dioxide | 20.3% by weight |
| water | 44.7% by weight |

This solution is recycled to the urea plant for use.

The hydrolyzer is provided with 9 baffles, of which five are cut only at their top to give a total height of 82% of the diameter, and the remaining four are cut symmetrically both at the top and at the bottom to give a total height of 84% of the hydrolyzer internal diameter.

I claim:

1. A process for the purification of the effluent originating from urea production plants and containing ammonia, carbon dioxide and urea as pollutants, said purification being conducted by hydrolysis and stripping to obtain treated effluent containing from 10 to 0.4 ppm of ammonia and urea, wherein said purification is conducted in three successive stages, comprising:
   a first stage in which said effluent to be treated is stripped with steam to release volatile pollutants, which are then recycled to the urea production plant in a liquid or vapor phase;
   a second stage in which the effluent obtained from the preceding stage is hydrolyzed to decompose non-volatile components urea and biuret, said decomposition being conducted at pressure of 20-40 bars gauge, at a temperature of 200°-240° C. and with a residence time of 20-40 minutes, in a horizontal cylindrical reactor the interior of which comprises a succession of vertical baffles which separate the reactor into a plurality of hydrolysis zones defining a tortuous path with a piston flow of said effluent, and from each of which the vapor phase produced is separated, said baffles consisting alternately of circular plates cut horizontally both at their top and at their bottom, so that their total height is 70-90% of the internal diameter of the reactor, said vapor phase being combined with the vapor phase obtained from the stripping stage to be then recycled to the urea production plant;
   a third stage in which the effluent which has undergone hydrolysis is further stripped with steam, the stripping stages being conducted at a pressure of 1.5-4 bars gauge and at a temperature of 128°-150° C.

2. A process for treating the effluent originating from urea production plants as claimed in claim 1 wherein the first and third stage which strip the effluent before and after the hydrolysis are implemented in two sections of one and the same column which are connected together by a stack plate.

3. A process for treating effluent originating from urea production plants as defined in claim 2 wherein vapor produced by the hydrolysis stage is fed to the column of the first stripping stage.

4. A process for treating the effluent originating from urea production plants defined in claim 2, wherein the hydrolysis operating conditions for obtaining effluent with an ammonia and urea content of less than 1 ppm are the following:

| pressure | 33-37 bars gauge |
|---|---|
| temperature | 230-236° C. |
| No. of baffles | 8-12 |
| baffle height | 75-85% of the diameter |
| residence time | 30-40 minutes. |

5. A process for treating the effluent originating from urea production plants as defined in claim 1 wherein vapor produced by the hydrolysis stage is fed to the column of the first stripping stage.

6. A process for treating the effluent originating from urea production plants defined in claim 5, wherein the hydrolysis operating conditions for obtaining effluent with an ammonia and urea content of less than 1 ppm are the following:

| pressure | 33-37 bars gauge |
|---|---|

| | |
|---|---|
| temperature | 230–236° C. |
| No. of baffles | 8–12 |
| baffle height | 75–85% of the diameter |
| residence time | 30–40 minutes |

7. A process for treating the effluent originating from urea production plants defined in claim 1 wherein the hydrolysis operating conditions for obtaining effluent with an ammonia and urea content of less than 1 ppm are the following:

| | |
|---|---|
| pressure | 33–37 bars gauge |
| temperature | 230–236° C. |
| No. of baffles | 8–12 |
| baffle height | 75–85% of the diameter |
| residence time | 30–40 minutes. |

* * * * *

UNITED STATES PATENT AND TRADEMARK OFFICE
CERTIFICATE OF CORRECTION

PATENT NO. : 5,096,599
DATED : March 17, 1992
INVENTOR(S) : Franco Granelli

It is certified that error appears in the above-identified patent and that said Letters Patent is hereby corrected as shown below:

Col. 6,
In Claim 3, in line 2, it should read as --Claim 1-- not "Claim 2";
Col. 6,
In Claim 4, in line 2, it should read as --Claim 1-- not "Claim 2";
Col. 6,
In Claim 5, in line 2, it should read as --Claim 3-- not "Claim 1"; and
Col. 6,
In Claim 6, in line 2, it should read as --Claim 3-- not "Claim 5".

Signed and Sealed this

Fifth Day of October, 1993

Attest:

BRUCE LEHMAN

*Attesting Officer*     Commissioner of Patents and Trademarks